United States Patent [19]

Early

[11] 4,366,776
[45] Jan. 4, 1983

[54] SELF-LOCKING CATTLE HEAD GATE ASSEMBLY

[76] Inventor: Gary L. Early, P.O. Box 273, 125-A E. Pine St., Elsie, Mich. 48831

[21] Appl. No.: 211,094

[22] Filed: Nov. 28, 1980

[51] Int. Cl.³ .......................................... A01D 45/02
[52] U.S. Cl. ..................................................... 119/98
[58] Field of Search ................................... 119/98, 99

[56] References Cited

U.S. PATENT DOCUMENTS

| | | | |
|---|---|---|---|
| 2,969,770 | 1/1961 | Collins | 119/98 |
| 3,043,268 | 7/1962 | Sheriff | 119/98 |
| 3,135,240 | 6/1964 | Hickman | 119/99 |
| 3,814,060 | 6/1974 | Swenson | 119/98 |
| 3,885,527 | 5/1975 | Maffey | 119/98 |
| 4,027,629 | 6/1977 | Pearson | 119/98 |
| 4,100,886 | 7/1978 | Wade et al. | 119/98 |

Primary Examiner—Gene Mancene
Assistant Examiner—John J. Wilson
Attorney, Agent, or Firm—Miller, Morriss & Pappas

[57] ABSTRACT

A self-locking cattle head gate assembly is provided for restraining the head of an animal in a relatively immobilized position while medication or other treatment is administered thereto. A pivotally mounted chute gate is positioned at the end of a stall or animal chute so as to selectively effect lockable closure thereof. An animal shoulder-engaging head gate is pivotally mounted within the chute gate so as to be selectively openable therefrom. As the animal moves toward the closed chute gates, the head thereof extends through the closed chute gate and the shoulder thereof engages the open head gate so as to move the head gate to its closed locked position within the plane of the chute gate. As the head gate moves into its closed position within the chute gate, the upper end thereof engages and lifts a downwardly inclined lock latch plate pivotally mounted on and extending outwardly from the upper peripheral edge of the chute gate. When the head gate reaches its fully closed position within the plane established by the outer edges of the chute gate, the lock latch plate disengages from the head gate and drops back into its normal lock position behind the upper edge of the head gate so as to lock it into its closed position within the plane of the chute gate. In its closed position, the outer free vertical edge of the head gate cooperates with the inside surface of the vertical edge of the chute gate proximate thereto so as to restrain the neck of the animal therebetween. Thus restrained, the head of the animal extends outwardly beyond the head gate assembly in a relatively immobilized position so as to greatly facilitate the treatment of the animal as desired.

5 Claims, 13 Drawing Figures

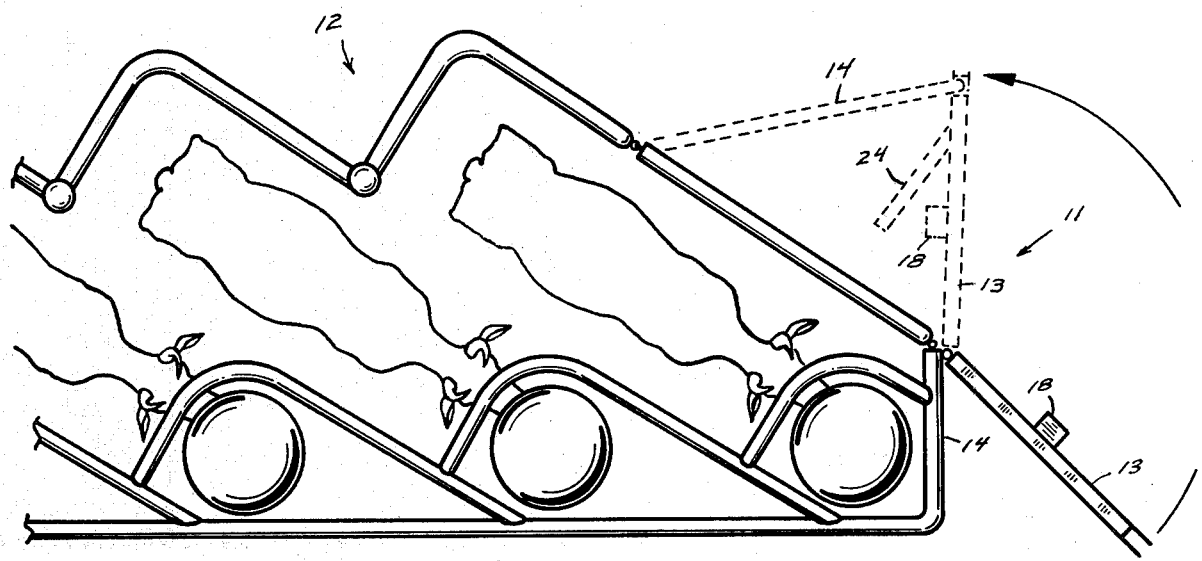
FIG. 1
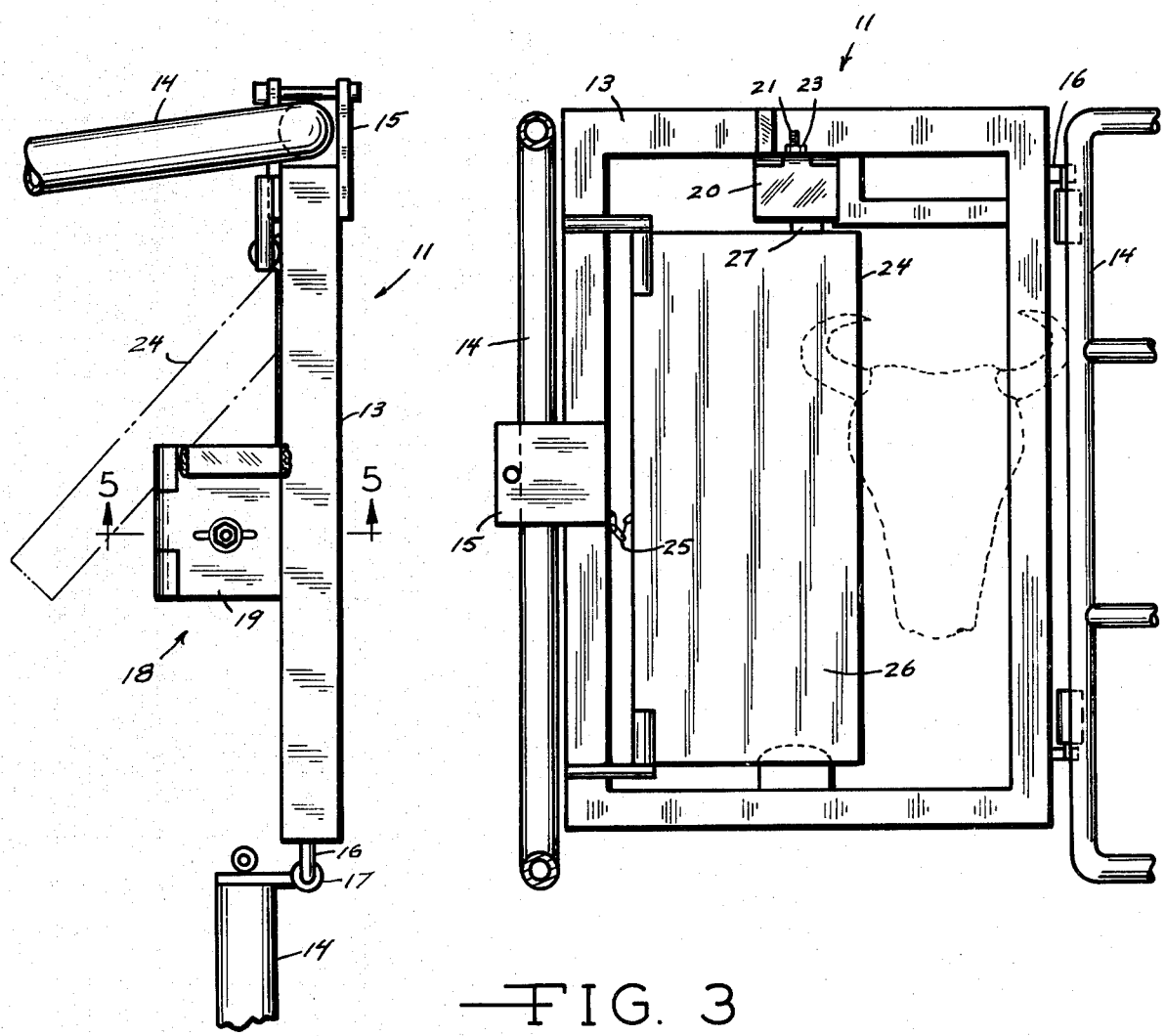
FIG. 2
FIG. 3

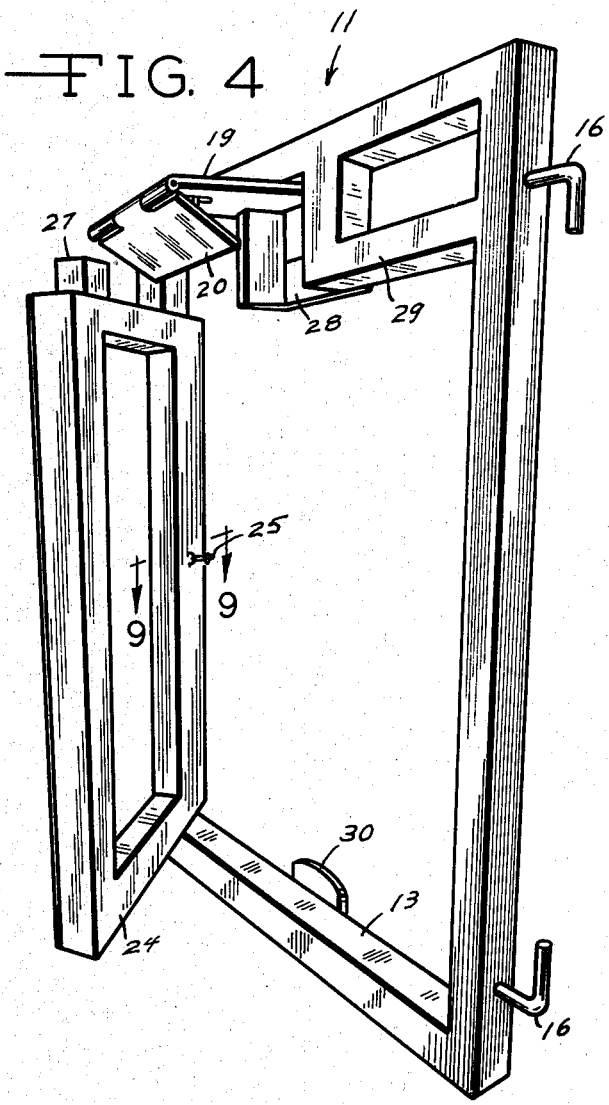
FIG. 4
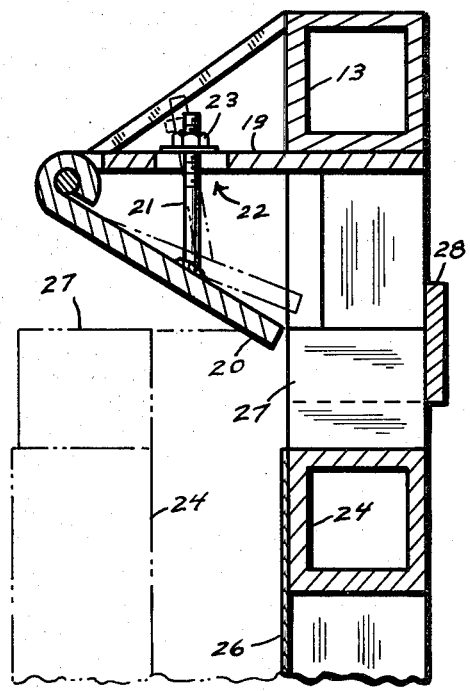
FIG. 5
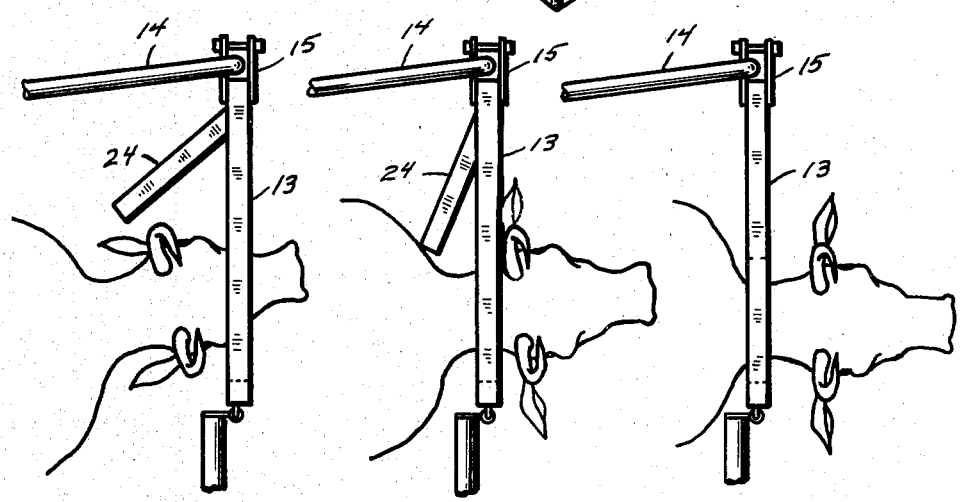
FIG. 6  FIG. 7  FIG. 8
FIG. 9

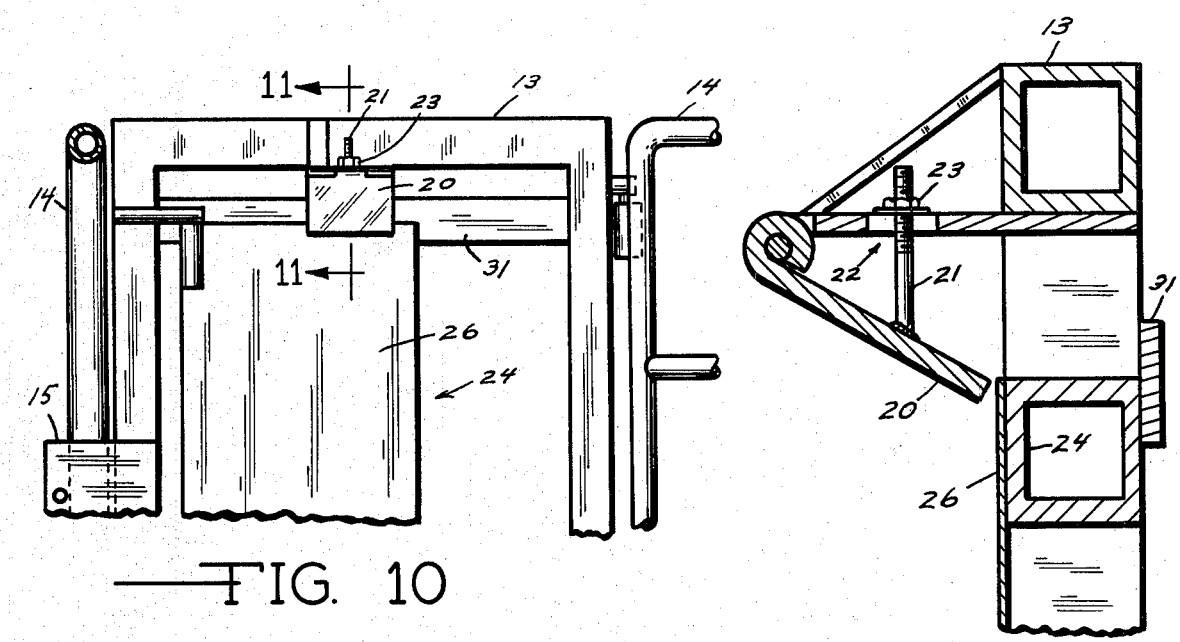
FIG. 10
FIG. 11
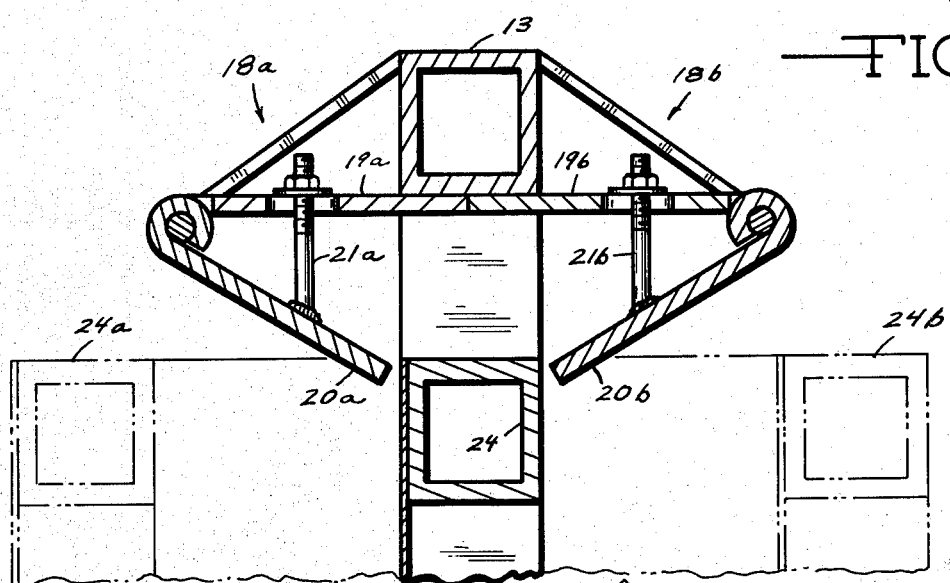
FIG. 13
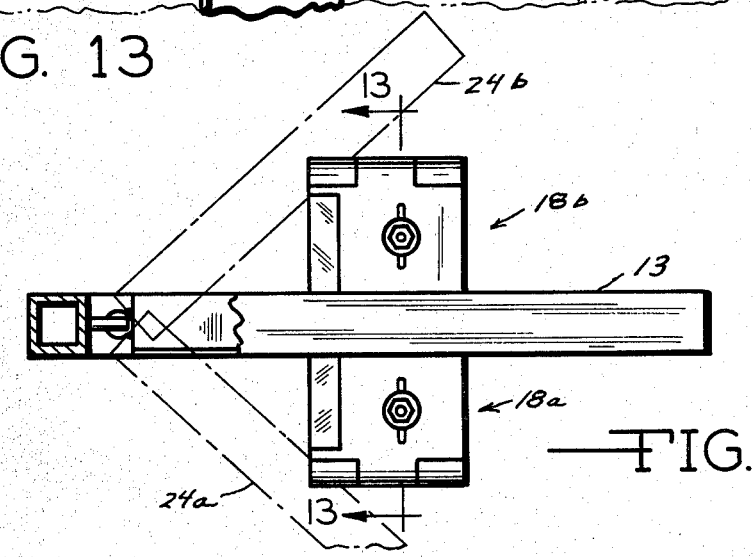
FIG. 12

SELF-LOCKING CATTLE HEAD GATE ASSEMBLY

SUMMARY OF THE INVENTION

This invention relates to a self-locking cattle head gate assembly for restraining the head of an animal in a relatively immobilized position while medication or other treatment as administered thereto. A pivotally mounted chute gate is positioned at the end of a stall or animal chute so as to selectively effect lockable closure thereof. An animal shoulder-engaging head gate is pivotally mounted within the chute gate so as to selectively openable therefrom. As the animal moves toward the closed chute gate, the head thereof extends through the closed chute gate and the shoulder thereof engages the open head gate so as to move the head gate to its closed locked position within the plane of the chute gate. As the head gate moves into its closed position within the chute gate, the upper end thereof engages and lifts a downwardly inclined lock latch plate pivotally mounted on and extending outwardly from the upper peripheral edge of the chute gate. When the head gate reaches its fully closed position within the plate established by the outer edges of the chute gate, the lock latch plate disengages from the head gate and drops back into its normal lock position behind the upper edge of the head gate so as to lock it into its closed position within the plane of the chute gate. In its closed position, the outer vertical edge of the head gate cooperates with the inside surface of the vertical edge of the chute gate proximate thereto so as to restrain the neck of the animal therebetween. Thus restrained, the head of the animal extends outwardly beyond the head gate assembly in a relatively immobilized position so as to greatly facilitate the treatment of the animal as desired.

Nowhere in the known prior art is there shown a self-locking cattle head gate assembly of this type whereby the head of an animal can be restrained in a relatively immobilized position so that medication can be orally administered thereto or other treatment involving the head of the animal can be effectively carried out.

It is therefore an object of this invention to provide a self-locking cattle head gate assembly which easily and effectively engages and restrains the neck and head of an animal in a relatively immobilized position so as to facilitate the treatment of the animal as desired.

Another object of this invention is to safely and effectively restrain an animal while medical or other treatment is administered thereto without the need for ancillary transporting and restraining harness equipment encompassing the entire body of the animal.

Yet another object of this invention is to provide an animal shoulder-engaging head gate which is selectively lockable within the plane of a chute gate so as to selectively restrain the neck of an animal therebetween.

Other objects and advantages found in the construction of the invention will be apparent from a consideration of the following specification in connection with the appended claims and the accompanying drawings.

IN THE DRAWINGS

FIG. 1 is a top view of a typical herringbone cattle feeding and milking parlor with a self-locking cattle head gate assembly in association therewith.

FIG. 2 is a top view of the self-locking cattle head gate assembly showing the chute gate in its closed position and the head gate provided therein shown in its open position in phantom line.

FIG. 3 is a front elevational view of the self-locking cattle head gate assembly showing in phantom-line the head of an animal restrained thereby.

FIG. 4 is a left perspective view of the self-locking cattle head gate assembly showing the locking latch means provided at the top of the chute gate with the head gate in its open position.

FIG. 5 is a fragmentary schematic cross-sectional view of the self-locking cattle head gate assembly showing in phantom line the interaction of the locking latch, the head gate and the head gate stop means.

FIG. 6 is a schematic top view of the self-locking cattle head gate assembly showing an animal approaching the closed chute gate with the head gate in its open position.

FIG. 7 is a schematic top view of the self-locking cattle head gate assembly showing the shoulder of the animal engaging and beginning to close the head gate as the animal moves forward.

FIG. 8 is a schematic top view of the self-locking cattle head gate assembly showing the animal restrained thereby.

FIG. 9 is a schematic cross-sectional view taken on line 9—9 of FIG. 4 showing the head gate travel limit chain.

FIG. 10 is another embodiment of the self-locking cattle head gate assembly wherein horizontal cross-bar stop means provided on the chute gate limits the forward movement of the head gate.

FIG. 11 is a fragmentary schematic cross-sectional side view taken on line 11—11 of FIG. 10.

FIG. 12 is a top view of another embodiment of the invention showing a dual lock latch plate arrangement permitting opening of the head gate in either direction.

FIG. 13 is a schematic cross-sectional side view taken on line 13—13 of FIG. 12.

DESCRIPTION

As shown generally in the drawings, the self-locking cattle head gate assembly 11 is provided for restraining the neck and head of an animal so as to maintain the head in a relatively immobilized position while medication or other treatment is administered thereto. As shown in FIG. 1, the self-locking head gate assembly 11 can be used in association with a herringbone cattle milking and/or feeding parlor 12. However, it is within the scope of the invention that the self-locking cattle head gate assembly 11 be used in association with a standard cattle chute or individual stall as desired.

As shown specifically in FIGS. 2 and 3, a chute gate 13 is pivotally mounted on a stall frame 14 so as to selectively close the chute or stall in association therewith. As shown in FIGS. 6 through 8, in one operative use environment, the chute gate 13 is selectively closeable against a stall frame edge or post 14. A lock assembly 15 is provided on the free vertical edge of the chute gate 13 so as to lockably engage the adjacent stall frame edge or post 14 as desired. As shown in FIG. 1, the chute gate 13 is pivoted to an open position when not in use so as to permit passage of cattle through the chute or stall as desired.

The chute gate 13 consists of a substantially rectangular frame which is provided with spaced-apart hinge pins 16 along one vertical edge thereof. The hinge pins 16 are adapted to engage mating socket members 17 provided on the adjoining stall frame 14 so as to permit pivotal swing movement of the chute gate 13 therefrom. However, it is within the scope of the invention to utilize any other standard type of pivot connection means to mount the chute gate 13 on the chute or stall frame 14.

As specifically shown in FIG. 4 and 5, a locking latch assembly 18 is provided on the upper horizontal portion of the chute gate 13. The locking latch assembly 18 consists of a horizontal mounting plate 19 which extends into the animal-approach portion of the chute or stall across which the chute gate 13 is selectively mounted. A downwardly-inclined lock latch plate 20 is pivotally mounted at the outer end of the mounting plate 19 and is selectively extendable thereunder. A latch plate limit rod 21 is fixedly provided on the upper surface of the latch plate 20 and extends upwardly therefrom through an opening 22 provided on the upper end of the limit rod 21 above the mounting plate 19. Thus positioned, the limit rod 21 is freely mounted through the opening 22 is response to corresponding movement of the inclined latch plate 20. The adjustable nut or head 23 limits the downward movement of the lock latch plate 20 and retains it in its operative use position below the mounting plate 19.

An animal shoulder-engaging head gate 24 is pivotally mounted within the chute gate 13 so as to be swingably openable therefrom. In the embodiment shown in the drawings, the head gate 24 is pivotally mounted on the vertical member of the chute gate 13 opposite the hinged portion of the chute gate 13. However, it is within the scope of the invention to mount the head gate 24 on the hinged vertical member of the chute gate 13 if so desired. As shown in FIG. 9, a limit chain 25 is provided to limit the travel of the head gate to its open position.

A barrier plate 26 coextensive with the head gate 24 is mounted thereon so as to prevent the head or body of the animal from extending therethrough.

In the embodiment of the invention shown in FIGS. 2 through 5, an upwardly extending stub locking post 27 is provided on the upper horizontal portion of the head gate 24. As shown in FIG. 5, the locking post 27 engages and raises the freely pivotal lock latch plate 20 as the head gate 24 is moved to its closed position within the plane of the chute gate 13. When the head gate 24 reaches its fully closed position against the stop member 28 provided on the chute gate 13, the latch plate 20 drops to its lowest downwardly inclined position behind the locking post 27, therebyautomatically locking the head gate 24 in its closed position against the stop member 28. In the embodiment of the invention shown in FIGS. 2 through 5, the stop member 28 is mounted on a lock post stop frame assembly 29 provided on the upper portion of the chute gate 13. An upwardly extending stop extension member 30 is also provided at the bottom of the chute gate 13 to add stability to the head gate 24 in its closed position with the plane of the chute gate 13.

Thus, in operation, the chute gate 13 is closed across the animal chute, passage way or stall as desired. The limit rod 21 is lifted so that the latch plate 20 moves upwardly to permit selective opening of the head gate 24 in the direction of the animal approach side of the chute gate 13. As shown in the sequential views of FIGS. 6 through 8, the animal to be treated approaches the self-locking open head gate 24. As the animal moves forward, its shoulder engages the head gate 24 and closes it within the chute gate 13. Thus positioned, the neck of the animal is restrained between outer vertical edge of the head gate 24 and the vertical member of the chute gate 13 spaced apart therefrom. In this position, the head of the animal extends beyond the chute gate 13 and is maintained in a relatively immobilized position against undesirable movement so that medication or other treatment can be easily administered. When the treatment has been completed, the lock latch plate 20 is lifted and the animal is backed off, opening the head gate and freeing the animal therefrom. The chute gate 13 is then opened so as to permit movement of the animal through the passageway, chute or stall.

Another embodiment of the invention is shown in FIGS. 10 and 11 wherein a cross-bar stop 31 is provided across the upper portion of the chute gate 13. Thus positioned, the cross-bar stop 31 engages the top of the head gate 24 and prevents the forward movement thereof when it is closed within the plane of the chute gate 13. As shown in the schematic cross-sectional view of FIG. 11, the head gate 24 is thus held in its closed position between the cross-bar stop 31 and the lock latch plate 20.

Yet another embodiment of the invention is shown in FIGS. 12 and 13 wherein dual oppositely extending locking latch assemblies 18a and 18b are provided on the top portion of the chute gate 13. This embodiment permits the head gate 24 to swing open in either direction in order to accommodate cattle approaching from either side of the chute gate.

As shown, the dual locking latch assemblies are in opposed register with each other as mounted on the upper peripheral edges of the chute gate.

As further shown in FIGS. 12 and 13, the head gate 24 can be selectively swung open to the positions 24a and 24b depending on the side of the head gate that the animal is approaching. For instance, if an animal is approaching from the left in FIG. 13, the shoulder of the animal engages the head gate 24 in the position illustrated, i.e., 24a. When the head gate 24a reaches its fully closed position within the chute gate 13, it is retained in its fully closed position between the lock latch plates 20a and 20b, thus restraining the neck and head of the animal as proviously described. After the animal has been treated, the head gate 24 can be selectively swung in either direction by lifting the respective limit rod 21a or 21b corresponding to the desired direction that the head gate is to be opened. For instance, if latch plate 20b is raised, then the head gate 24 will be free to open to the position illustrated, i.e., 24b. If it is desried to open the head gate 24 to the position illustrated as 24a, then the latch plate 20a is raised.

It is also considered to be within the scope of the invention that the chute gate be fixedly mounted across an animal with the head gate pivotally mounted therein and operable therefrom so as to permit passage of the animal through the chute gate upon completion of the treatment.

In summary, a self-locking head gate assembly is provided for selective mounting across an animal chute. A chute gate is provided for pivotal selective lockable closure across an animal chute. The chute gate is provided with a pair of spaced-apart vertical edge portions. An animal shoulder-engaging head gate is pivotally mounted along one vertical edge thereof within the chute gate so as to be selectively operable therefrom. The head gate is selectively closable within the plane of the chute gate so as to restrain the neck of an animal between the free vertical edge of the head gate and the vertical edge portion of the chute gate spaced apart therefrom.

Locking latch assembly means are provided on the upper portion of the chute gate. The locking latch assembly means are actuatable by closure movement of the head gate thereagainst so as to selectively retain the head gate in a locked position within the chute gate.

The locking latch assembly means comprises a normally downwardly inclined pivotally mounted inwardly extending lock latch plate provided on the upper portion of the chute gate. The latch plate is selectively liftable upon engagement with the upper portion of the head gate upon closure thereof. The latch plate is selectively returnable to a normally downwardly inclined position behind the head gate upon closure thereof within the plane of the chute gate. The latch plate is adapted to effect selective lockable closure of the head gate within the plane of the chute gate.

The self-locking cattle head gate assembly may include head gate stop means which are provided on the chute gate so as to prevent movement of the head gate beyond the plane of the chute gate upon closure of the head gate thereinto. The head gate stop means cooperate with the latch plate to selectively lock the head gate within the plane of the chute gate.

A modification of the self-locking head gate assembly is provided wherein a pair of oppositely extending locking latch assemblies are provided on the chute gate in opposed register with each other. In this modification, a chute gate is provided for pivotal selective lockable closure across an animal chute. The chute gate is provided with a pair of spaced-apart vertical edge portions.

An animal shoulder engaging head gate is pivotally mounted along one vertical edge thereof within said chute gate so as to be selectively openable therefrom in either direction. The head gate is selectively closable within the plane of said chute gate so as to restrain the neck of an animal between the free vertical edge of the head gate and the vertical edge portion of the chute gate spaced apart therefrom. A pair of oppositely extending locking latch assembly means are provided on the upper portion of said chute gate in opposed register with each other. Each of the locking latch assembly means are selectively actuatable by selective closure movement of the head gate thereagainst. The locking latch assemblies cooperate with each other to selectively retain the head gate in a locked position within the plane of the chute gate.

It is thus seen that a highly utilitarian self-locking cattle head gate assembly is provided having versatility in use and which eliminates the need for ancillary harnesses and/or transfer units hitherto needed to restrain or immobilize the head of an animal while medication or other treatment was administered thereto.

Various other modifications of the invention may be made without departing from the principle thereof. Each of the modifications is to be considered as included in the hereinafter appended claims, unless these claims by their language expressly provide otherwise.

I Claim:

1. In a self-locking head gate assembly for selective mounting across an animal chute comprising:
   a chute gate provided for selective lockable closure across an animal chute, said chute gate definign a pair of spaced-apart vertical edge portions;
   an animal shoulder engaging head gate pivotally mounted along one vertical edge thereof within said chute gate so as to selectively openable therefrom, said head gate having means for engaging an animal's shoulder so as to be animal actuated to a selectively closable position within the plane of said chute gate so as to restrain the neck of an animal between the free vertical edge of said head gate and the vertical edge portion of said chute gate spaced apart therefrom; and
   locking latch assembly means provided on the upper portion of said chute gate, said locking latch assembly means actuatable by movement of said head gate thereagainst so as to selectively retain said head gate in a locked position within the chute gate.

2. In the self-locking cattle head gate assembly of claim 1 wherein said locking latch assembly means include a normally downwardly inclined pivotally mounted inwardly extending lock latch plate provided on the upper portion of said chute gate, said latch plate selectively liftable upon engagement with upper portion of said head gate upon closure thereof, said latch plate means selectively returnable to a normally downwardly inclined position behind said head gate upon closure thereof within the plane of said chute gate, said latch plate means adapted to effect selective lockable closure of said head gate within the plane of said chute gate.

3. In the self-locking cattle head gate assembly of claim 1 wherein head gate stop means are provided on said chute gate so as to prevent movement of said head gate beyond the plane of said chute gate upon closure of the head gate thereinto, said head gate stop means cooperating with said latch plate means to selectively lock said head gate within the plane of said chute gate.

4. In a self-locking cattle head gate assembly for selective mounting across an animal chute comprising:
   a chute gate provided for selective lockable closure across an animal chute, said chute gate defining a pair of spaced-apart vertical edge portions;
   an animal shoulder engaging head gate pivotally mounted along one vertical edge thereof within said chute gate so as to be selectively openable therefrom in either direction, said head gate having means for engaging an animal's shoulder so as to be animal actuated to a selectively closable position within the plane of said chute gate so as to restrain the neck of an animal between the free vertical edge of said head gate and the vertical edge portion of said chute gate spaced apart therefrom; and
   a pair of opposed oppositely extending locking latch assembly means provided on the upper portion of said chute gate, each of said locking latch assembly means selectively actuatable by selective closure movement of said head gate thereagainst, said locking latch assemblies cooperating to selectively retain said head gate in a locked position within the plane of said chute gate.

5. In a self-locking cattle head gate assembly for selective mounting across an animal chute comprising:
   a chute gate provided for selective lockable closure across an animal chute, said chute gate defining a pair of spaced-apart vertical edge portions;
   an animal shoulder engaging head gate pivotally mounted along one vertical edge thereof within said chute gate so as to selectively openable therefrom, said head gate having means for engaging an animal's shoulder so as to be animal actuated to a selectively closable position within the plane of said chute gate so as to restrain the neck of an animal between the free vertical edge of said head gate and the vertical edge portion of said chute gate spaced-apart therefrom;

an upwardly extending stub locking post fixedly mounted on the upper portion of the head gate; and locking latch assembly means provided on the upper portion of said chute gate, said locking latch assembly means actuatable by movement of said stub locking post thereagainst so as to selectively retain said head gate in a locked position within the chute gate.

* * * * *